(12) United States Patent
Muffoletto et al.

(10) Patent No.: US 6,334,879 B1
(45) Date of Patent: Jan. 1, 2002

(54) METHOD FOR PROVIDING A HERMETICALLY SEALED CAPACITOR

(75) Inventors: Barry C. Muffoletto, Alden; Rodney E. Stringham, Corfu; Neal N. Nesselbeck, Lockport; Ashish Shah, East Amherst; Donald H. Stephenson, Williamsville, all of NY (US)

(73) Assignee: Wilson Greatbatch Ltd., Clarence, NY ( * ) Notice: Subject to any disclaimer, the term of this patent is extended or adjusted under 35 U.S.C. 154(b) by 0 days.

(21) Appl. No.: 09/271,513

(22) Filed: Mar. 18, 1999

Related U.S. Application Data

(63) Continuation-in-part of application No. 08/847,948, filed on May 1, 1997, now Pat. No. 5,926,362.

(51) Int. Cl.[7] .............................. H01G 9/00; H01G 9/08; H01G 9/10; H01L 21/64
(52) U.S. Cl. ...................... 29/25.03; 29/25.01; 29/25.02; 361/503; 361/517; 361/518; 361/519; 361/535; 361/536; 361/537
(58) Field of Search .......................... 29/25.03; 361/796, 361/502–503, 508–509, 516–520, 523, 528–529, 535–538

(56) References Cited

U.S. PATENT DOCUMENTS

| | | |
|---|---|---|
| 3,316,463 A | 4/1967 | Cornado et al. ............. 317/230 |
| 3,431,473 A | 3/1969 | Cormier et al. ............. 317/258 |
| 4,242,374 A | 12/1980 | Sansregret .................... 427/76 |
| 4,266,332 A | 5/1981 | Markarian et al. ............ 29/570 |
| 4,494,170 A | 1/1985 | Schilling .................... 361/306 |
| 5,331,504 A | 7/1994 | Kamiya et al. ............. 361/301 |
| 5,367,431 A | 11/1994 | Kunishi et al. ............. 361/502 |
| 5,371,650 A | 12/1994 | Lavene ....................... 361/310 |
| 5,384,685 A | 1/1995 | Tong et al. .................. 361/503 |
| 5,428,501 A | 6/1995 | Bruder ........................ 361/535 |
| 5,464,453 A | 11/1995 | Tong et al. ................ 29/25.03 |
| 5,469,325 A | 11/1995 | Evans ......................... 361/526 |
| 5,471,365 A | 11/1995 | Nakamura et al. .......... 361/523 |
| 6,059,847 A | * 5/2000 | Farahmandi et al. ....... 29/25.03 |

* cited by examiner

Primary Examiner—John F. Niebling
Assistant Examiner—Ha Tran Nguyen
(74) Attorney, Agent, or Firm—Hodgson Russ LLP

(57) ABSTRACT

A sealed capacitor, which may be hermetic, having a generally flat, planar geometry, is described. The capacitor includes at least one electrode provided by a metallic substrate having a capacitive material contacted thereto. The coated substrate can provide at least one of the casing side walls itself or, be connected to the side wall. A most preferred form of the capacitor has the conductive substrate provided with the capacitive material formed from an ultrasonically generated aerosol.

33 Claims, 7 Drawing Sheets

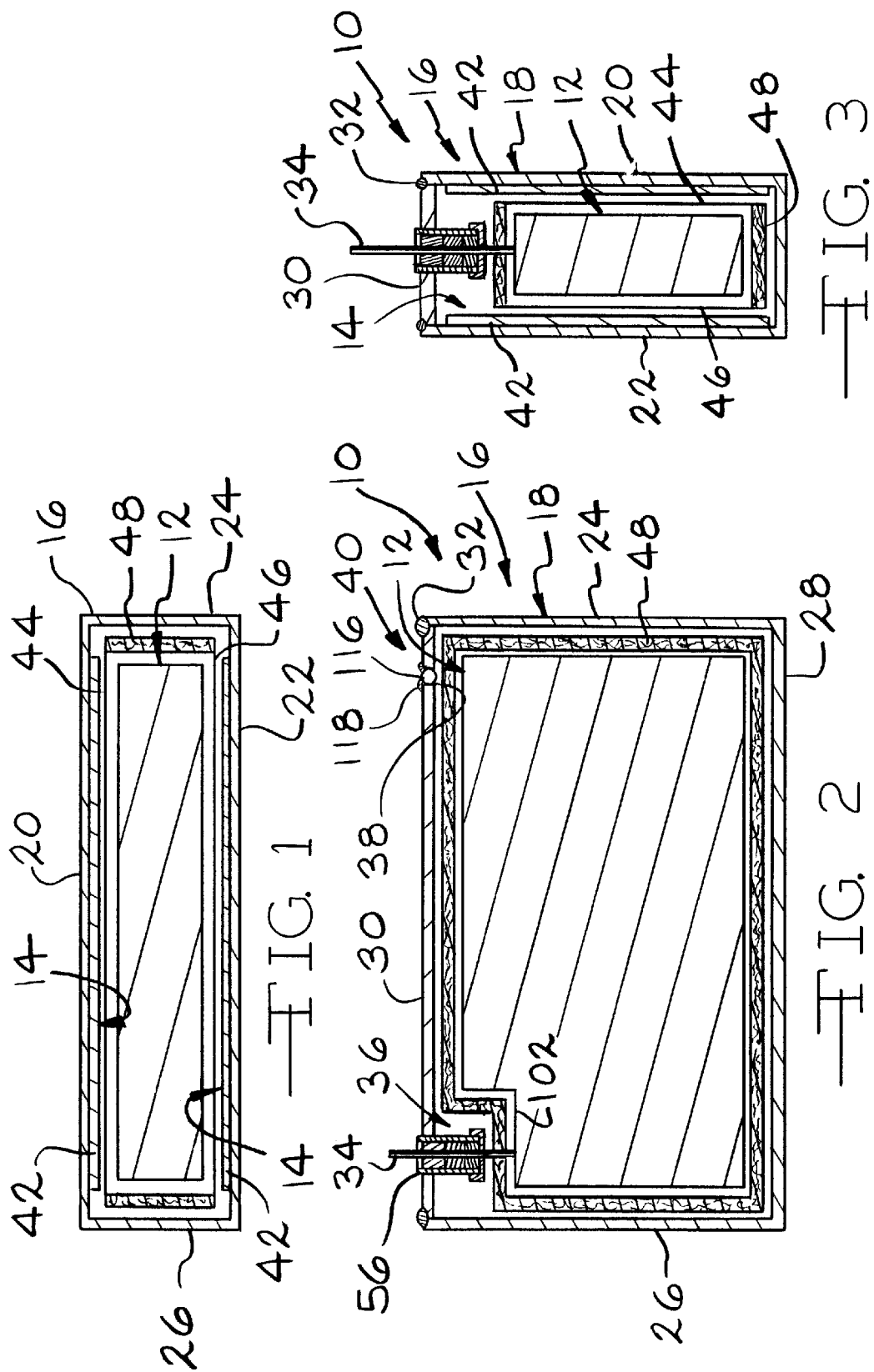

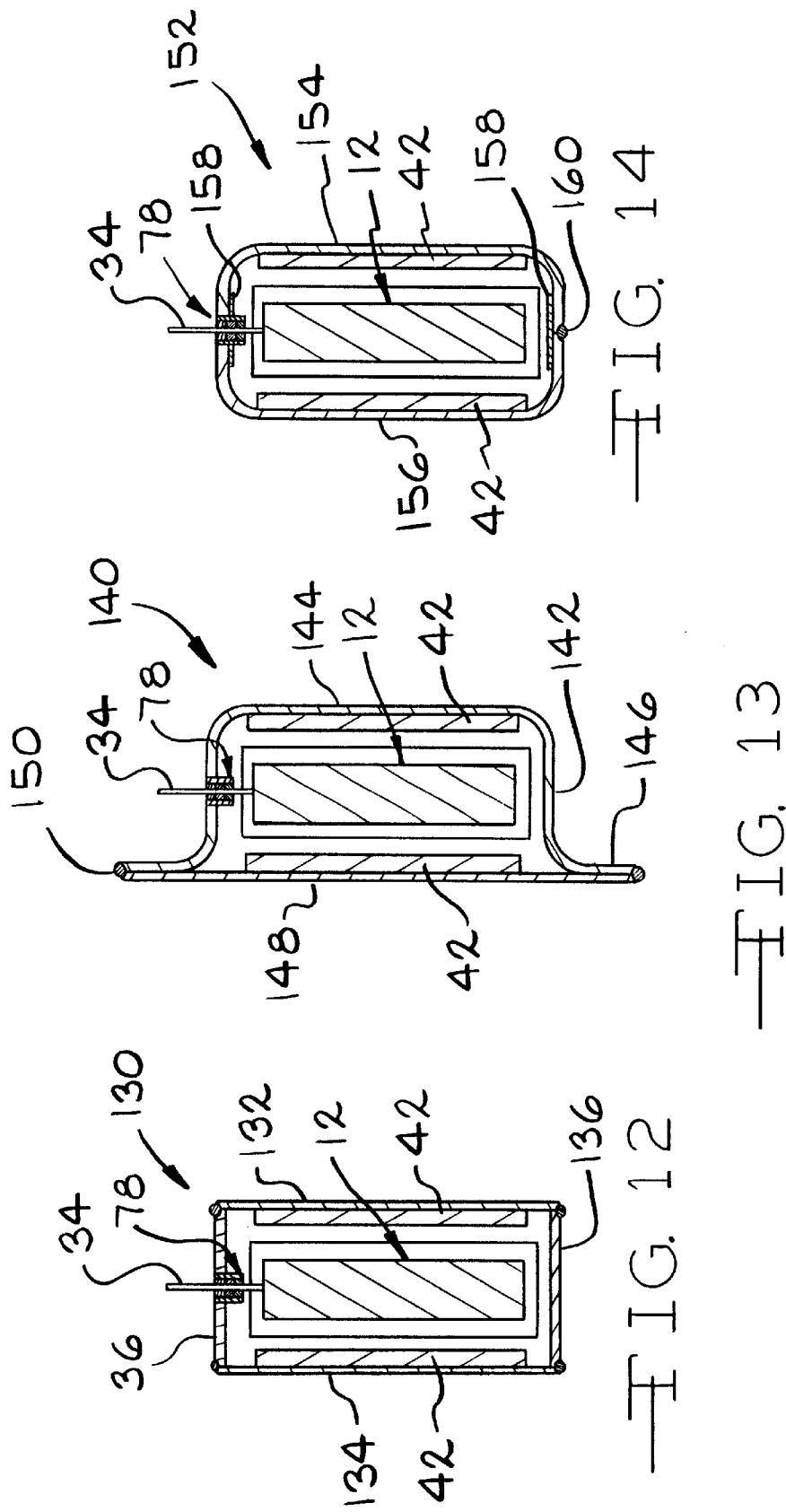

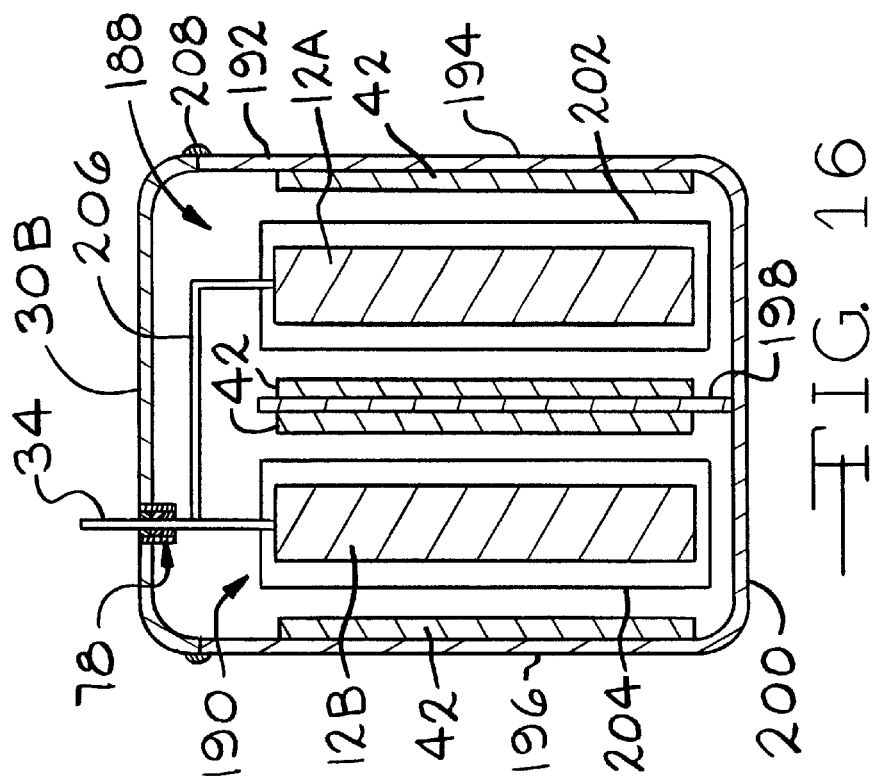
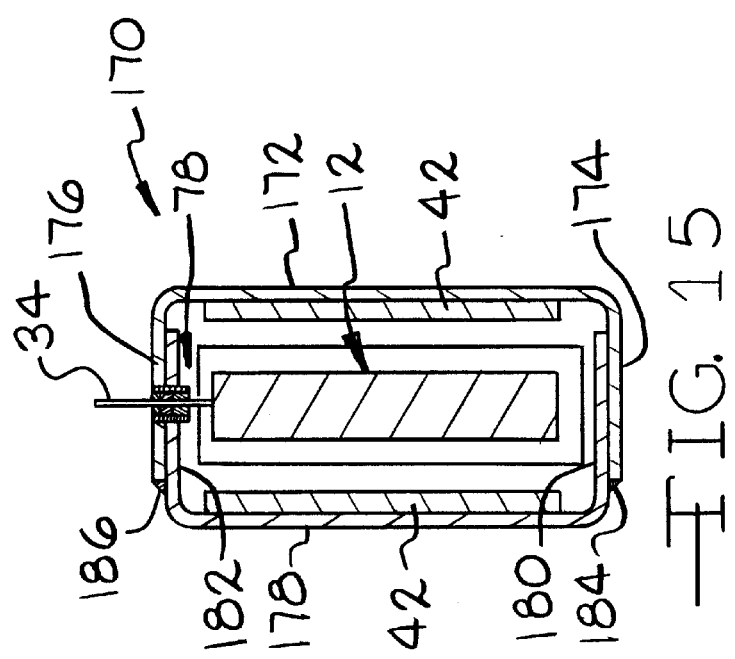

METHOD FOR PROVIDING A HERMETICALLY SEALED CAPACITOR

CROSS-REFERENCE TO RELATED APPLICATION

This application is a continuation-in-part application of U.S. application Ser. No. 08/847,948, filed May 1, 1997, now U.S. Pat. No. 5,926,362 to Muffoletto et al.

BACKGROUND OF THE INVENTION

1. Field of the Invention

The present invention generally relates to a capacitor, and more particularly, to a capacitor having a substantially flat, planar geometry. Still more particularly, the present invention relates to a metallic substrate provided with capacitive material contacted thereto and incorporated into a hermetically sealed casing to provide at least one of the electrodes for the capacitor. The metallic substrate can provide at least one of the casing side walls itself or be connected to the side wall. A most preferred form of the capacitor has the conductive substrate provided with a pseudocapacitive material formed from an ultrasonically generated aerosol.

2. Prior Art

Standard capacitor construction consists of a cylindrically shaped case housing an anode electrode and a cathode electrode. For example, standard wet slug tantalum capacitors generally have a cylindrically shaped conductive casing serving as the terminal for the cathode electrode with the tantalum anode connected to a terminal lead electrically insulated from the casing by a glass-to-metal insulator and seal structure. The anode insulator and seal structure is disposed either internally or externally of the casing. The opposite end of the casing is also typically provided with an insulator structure. The cylindrical shape limits the internal volume inside the capacitor and the closing seal structures occupy volume that detracts from the capacitor's volumetric efficiency.

Furthermore, the capacitor of the present invention having a flat, planar shape can comprise either an electrochemical type capacitor or electrolytic type capacitor. The anode and/or the cathode in a typical electrochemical capacitor or the cathode in an electrolytic capacitor generally include a substrate of a conductive metal such as titanium or tantalum having a capacitive material provided thereon. In that respect, the capacitive material may be in the form of an anodized-etched foil, a sintered active material with or without oxide, a double layer capacitive material such as a carbonaceous capacitive material or platinum black, a semiconductive material, pseudocapacitive material such as a redox or under potential material, and conducting polymers. Commonly used coating techniques for contacting these materials to the substrate include dipping, sputtering and pressurized air atomization spraying of a solution of the capacitive material onto the substrate. Capacitance values for electrodes made by these prior art techniques are lower in specific capacitance than an electrode coated with an ultrasonically generated aerosol of active material according to the present invention. Sol-gel deposition is another prior art method of coating a substrate, and this method also provides capacitor electrodes lower in specific capacitance than ultrasonically generated aerosol coatings.

SUMMARY OF THE INVENTION

The present invention provides a hermetically sealed capacitor housed in a casing having a generally flat, planar profile. Additionally, the present capacitor having the flat, planar shape provided by spaced apart side walls joined by a surrounding intermediate wall includes an anode electrode and a cathode electrode, at least one of which is comprised of a conductive substrate having capacitive properties itself or, a capacitive material contacted thereto. The active material may be contacted to the substrate in the form of an ultrasonically generated aerosol of the active material. The conductive substrate is fabricated to the desired shape of the casing side wall serving as one electrode terminal with the active material in electrical association with a counter electrode or, the conductive substrate is electrically connected to the casing.

These and other aspects of the present invention will become more apparent to those skilled in the art by reference to the following description and the appended drawings.

BRIEF DESCRIPTION OF THE DRAWINGS

FIG. 1 is a plan, cross-sectional view of a capacitor 10 according to the present invention.

FIG. 2 is an elevational, cross-sectional view of the capacitor 10 shown in FIG. 1.

FIG. 3 is an elevational, cross-sectional view of the capacitor 10 shown in FIG. 2 rotated 90 degrees.

FIGS. 12 to 15 are elevational, cross-sectional views of various alternate embodiments of capacitors according to the present invention.

FIG. 16 is an elevational, cross-sectional view of side-by-side capacitors 188 and 190 connected in parallel.

DETAILED DESCRIPTION OF THE INVENTION

Figure 5:
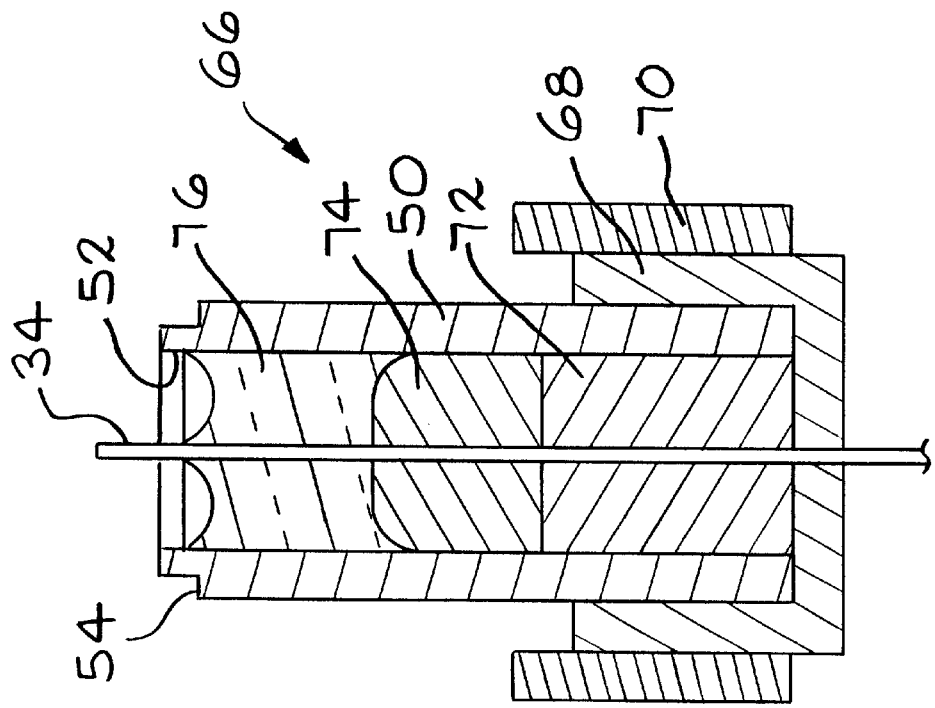
FIGS. 4 to 7 are fragmentary, cross-sectional views of alternate embodiments of insulator and seal structures for a terminal lead 34 for the capacitor 10.

Referring now to the drawings, FIGS. 1 to 3 illustrate an exemplary capacitor 10 according to the present invention. Capacitor 10 comprises an anode 12 and a cathode 14 housed inside of a hermetically sealed casing 16. The capacitor electrodes are activated and operatively associated with each other by an electrolyte contained inside the casing 16, as will be described in detail hereinafter. It should be pointed out that the capacitor 10 can be of either an electrochemical type wherein both the anode and the cathode electrodes are provided by conductive substrates having a capacitive material contacted thereto according to the present invention or, of an electrolytic type wherein the cathode electrode is provided by a conductive substrate having capacitive properties. The exemplary capacitor 10 illustrated in FIGS. 1 to 3 is of the latter type, however, this should not be construed as limiting.

Casing 16 includes a deep drawn can 18 having a generally rectangular shape comprised of spaced apart side walls 20 and 22 extending to and meeting with opposed end walls 24 and 26 extending from a bottom wall 28. A lid 30 is secured to the side walls 20, 22 and the end walls 24, 26 by a weld 32 to close the casing 16. Casing 16 is of a conductive metal and as such serves as one terminal or contact for making electrical connection between the capacitor and its load. The weld is provided by any conventional means, however, a preferred method is by laser welding.

The other electrical terminal or contact for the capacitor 10 is provided by a conductor or lead 34 extending from within the capacitor 10 through casing 16 and in particular through lid 30. Lead 34 is insulated electrically from the metal lid 30 by an insulator and seal structure 36, which will be described in detail presently. An electrolyte fill opening 38 in lid 30 is closed by a closure structure 40, in a manner which will be described in detail hereinafter.

The cathode electrode 14 is spaced from the anode electrode 12 housed inside the casing and comprises an electrode active material 42 provided on a conductive substrate. The active material has a thickness of about a hundred Angstroms to about 0.1 millimeters. When the casing 16 serves as one terminal or contact for the capacitor, the casing, and in particular the can 18, serves as the conductive substrate or, the conductive substrate provided with the active material 42 is electrically connected to the can 18. In either case, the conductive substrate is selected from the group consisting of tantalum, titanium, nickel, molybdenum, niobium, cobalt, stainless steel, tungsten, platinum, palladium, gold, silver, copper, chromium, vanadium, aluminum, zirconium, hafnium, zinc and iron, and mixtures and alloys thereof. The lid 30 is also preferably of one of the above conductive materials. Preferably the conductive substrate has a thickness of about 0.001 to 2 millimeter.

Preferably the substrate is cleaned of contaminants by lubricants from handling equipment or body oils from hands and the like and roughened by chemical or mechanical means to increase its surface area prior to being contacted with the active material 42. If desired, the electrical conductivity of the uncoated substrate can be improved by a technique described in U.S. application Ser. No. 08/847,946 entitled "Method of Improving Electrical Conductivity of Metals, Metal Alloys and Metal Oxides", which is assigned to the assignee of the present invention and the disclosure of which is incorporated herein by reference.

After preparation, the active material 42 is contacted to the conductive substrate preferably after but possibly before the prepared substrate is cut, shaped or otherwise fabricated into the desired geometry. To provide a capacitor electrode, the substrate may be of an anodized-etched conductive material, have a sintered active material with or without oxide contacted thereto, be contacted with a double layer capacitive material, for example a finely divided carbonaceous material such as graphite or carbon or platinum black, a semiconductive material, a redox, pseudocapacitance or an under potential material, or an electroactive conducting polymer such as polyaniline, polypyrole, polythiophene and polyacetylene, and mixtures thereof. As will be described in detail hereinafter, the capacitive material is preferably contacted to the conductive substrate in the form of an ultrasonically generated aerosol of the conductive material. In the case of the can 18 serving as the conductive substrate, an articulating spray head of a well known type is used to coat the interior surfaces of the can 18 with the ultrasonically generated aerosol of the desired material. FIGS. 1 to 3 show that the majority of side walls 20 and 22 are provided with the electrode active material 42. Other configurations of active material contacted to the conductive side walls are contemplated by the scope of the present invention as needed for a particular capacitor application.

According to one preferred aspect of the present invention, the redox active material 42 includes an oxide of a first metal, the nitride of the first metal, the carbon nitride of the first metal, and/or the carbide of the first metal, the oxide, nitride, carbon nitride and carbide of the first metal having pseudocapacitive properties. The first metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel and lead.

The redox active material 42 may also include a second or more metals. The second metal is in the form of an oxide, a nitride, a carbon nitride or a carbide, and is not essential to the intended use of the conductive substrate as a capacitor electrode and the like. The second metal is different than the first metal and is selected from one or more of the group consisting of tantalum, titanium, nickel, iridium, platinum, palladium, gold, silver, cobalt, molybdenum, ruthenium, manganese, tungsten, iron, zirconium, hafnium, rhodium, vanadium, osmium, and niobium. In a preferred embodiment of the invention, the active material product 42 includes oxides of ruthenium or ruthenium and tantalum.

In accordance with one embodiment of the present invention, the fabricated can 18 is provided with the active material 42 containing at least the first pseudocapacitive metal and possibly the second or more metals deposited on the side walls 20 and 22 of can 18 (FIG. 3) serving as the conductive substrate. Alternatively and as will be described in detail hereinafter, a conductive substrate of one of the enumerated materials is first provided with the redox active material coating and the thusly processed substrate is then contacted to the casing side walls (FIGS. 12 to 16). As previously discussed, the processed conductive substrate can provide the anode and/or the cathode in an electrochemical capacitor, or the cathode in an electrolytic capacitor. The exemplary capacitor shown in FIGS. 1 to 3 is of the electrolytic type and the cathode active material preferably coats the side walls beginning at a position spaced from the bottom wall of the casing to a distance spaced from the lid. Such a coating is accomplished by providing the conductive substrate with a masking material in a known manner so that only an intended area of the substrate is contacted with active material. The masking material is removed from the substrate prior to capacitor fabrication. Preferably, the cathode active material is substantially aligned in a face-to-face relationship with the anode major surfaces.

A preferred coating process is described in U.S. Pat. No. 5,894,403 to Shah et al., entitled "Ultrasonically Coated Substrate For Use In A Capacitor And Method Of Manufacture" or, by the coating process described in U.S. Pat. No. 5,920,455 to Shah et al., entitled "One Step Ultrasonically Coated Substrate For Use In A Capacitor". These applications are both assigned to the assignee of the present invention and the disclosures thereof are incorporated herein by reference. In that manner, the ultrasonically generated active material contacted to the conductive substrate has a majority of its particles with diameters of less than about 10 microns. This provides an internal surface area for the active material of about 10 $m^2$/gram to about 1,500 $m^2$/gram.

The anode electrode 12 is typically of a metal selected from the group consisting of tantalum, aluminum, titanium, niobium, zirconium, hafnium, tungsten, molybdenum, vanadium, silicon and germanium, and mixtures thereof in the form of a pellet. As is well known by those skilled in the art, the anode metal in powdered form, for example tantalum powder, is compressed into a pellet having an anode lead 34 extending therefrom, and sintered under a vacuum at high temperatures. The porous body is then anodized in a suitable electrolyte to fill the pore with the electrolyte and to form a continuous dielectric oxide film on the sintered body. The assembly is then reformed to a desired voltage, as is well known by those skilled in the art to produce an oxide layer over the terminal lead/anode lead weld. The anode can also be of an etched aluminum or titanium foil or, a sintered aluminum or titanium body.

A separator structure of electrically insulative material is provided between the anode 12 and the cathode 14 to prevent an internal electrical short circuit between the electrodes. The separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the capacitor 10. Illustrative separator materials include woven and non-woven fabrics of polyolefinic fibers including polypropylene and polyethylene or fluoropolymeric fibers including polyvinylidene fluoride, polyethylenetetrafluoroethylene, and polyethylenechlorotrifluoroethylene laminated or superposed with a polyolefinic or fluoropolymeric microporous film, non-woven glass, glass fiber materials and ceramic materials. Suitable microporous films include a polyethylene membrane commercially available under the designation SOLUPOR (DMS Solutech), a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.). Cellulose based separators also typically used in capacitors are contemplated by the scope of the present invention. Depending on the electrolyte use, the separator can be treated to improve its wettability, as is well known by those skilled in the art.

FIGS. 1 to 3 illustrate one embodiment of a separator structure according to the present invention wherein spaced apart sheets of 44, 46 of one of the above-referenced separator materials, for example sheets of microporous, polyolefinic film, are connected to a polymeric ring 48. The sheets 44 and 46 are disposed intermediate the anode 12 and the coated side walls 20 and 22, respectively, serving as the cathode electrode 14. The microporous structure provides for ion flow therethrough during charge and discharge cycles while the polymeric ring 48 frames the sheets 44, 46 to provide structural support for them. Alternatively, the polymeric ring can be eliminated and the separator sheets 44, 46 are sealed to each other in a known manner at their peripheries to envelope the anode 12.

Figure 4:
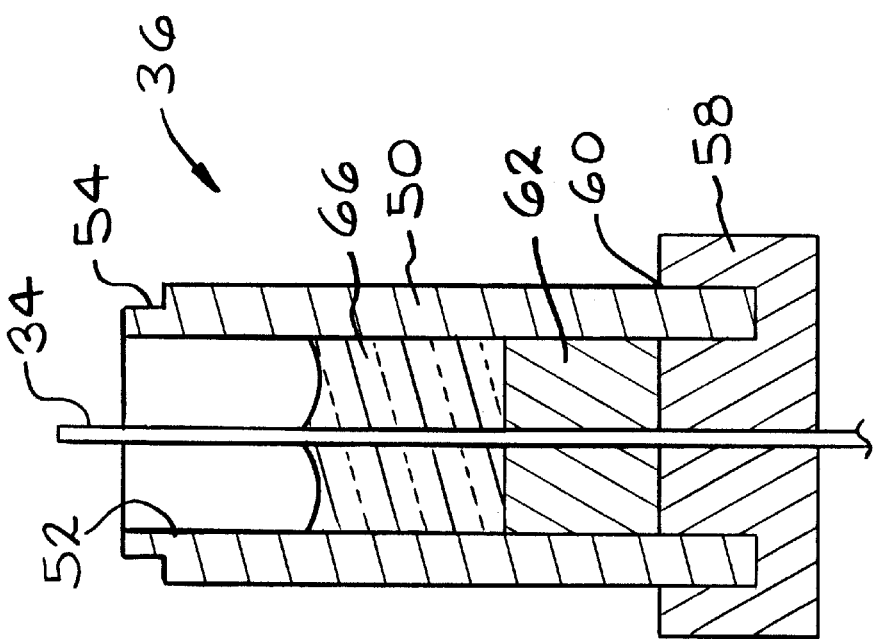

As shown in enlarged detail in FIG. 4, the insulator and seal structure 36 for the terminal lead 34 comprises a header or ferrule element 50 defining an internal cylindrical through bore or passage 52 of constant inside diameter. An outwardly facing step 54 is provided at the upper end of ferrule 50 having an outer surface sized to fit in an opening 56 (FIGS. 2 and 3) in lid 30 with the upper end of ferrule 50 secured therein by welding and the like. The terminal lead 34 is secured and sealed within ferrule by a series of sealing materials. A first layer is provided by a disc or plug 58 of synthetic polymeric material having an annular groove 60 that receives the lower end of the ferrule 50 seated therein. A second layer 62 is of synthetic polymeric material such as elastomeric materials that are capable of sealing between lead 34 and the inner surface of ferrule 50 and which can be the same as or different than the first layer. The second layer 62 is provided in ferrule 50 contacting the plug 58 and a suitable material is, for example Master-Sil 151 made by Master Bond. Finally, a glass layer 66 provides a hermetic seal between the inside of the ferrule 50 and the terminal lead 34. The glass used is, for example Elan Type 88 or Mansol Type 88. The anode terminal lead 34 preferably comprises the same material as the anode 12.

FIG. 5 shows another embodiment of an insulator and seal structure 66 for terminal lead 34 according to the present invention wherein a cup-shaped synthetic polymeric member 68 receives the ferrule 50 resting on a base portion of the cup 68. A compression ring 70 is sized to surround the annular wall of cup member 68 thereby biased in a sealing engagement with the outer surface of ferrule 50. A second, polymeric layer 72, a third, polymeric layer 74 and fourth, glass layer 76 are then provided in the ferrule 50 sealing between bore 52 and lead 34 in a similar manner as previously described with respect to the seal structure 36 shown in FIG. 4.

Figure 6:
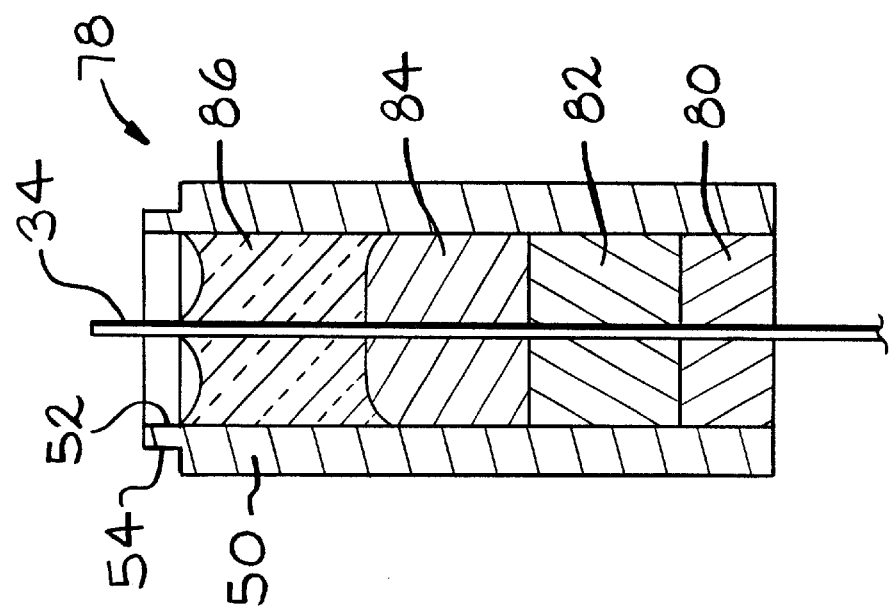

FIG. 6 illustrates another embodiment of an insulator and seal structure 78 for terminal lead 34 according to the present invention including a first layer 80 of synthetic polymeric material, a second, synthetic polymeric layer 82, a third, polymeric layer 84 and a fourth, glass layer 86 provided successively in the ferrule 50 sealing between bore 52 and lead 34 in a manner similar to the insulator and seal structures shown in FIGS. 4 and 5.

Figure 7:
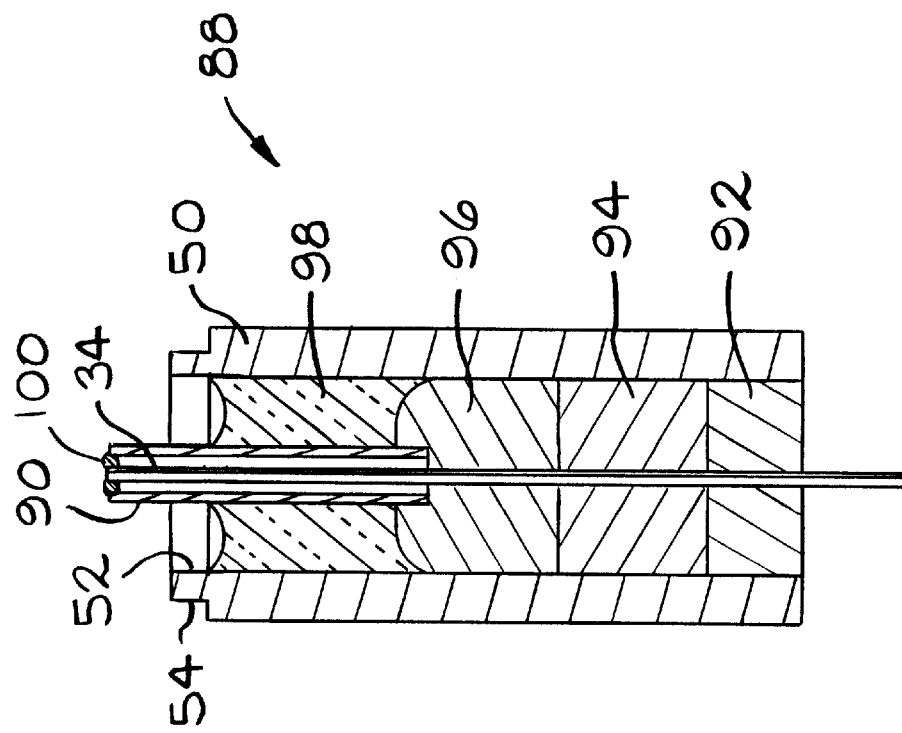

FIG. 7 shows an alternate embodiment of an insulator and seal structure 88 according to the present invention including a metal sleeve 90 fitted around and along a portion of the terminal lead 34 inside the ferrule 50. Sleeve 90 has an inner diameter that is somewhat greater than the outer diameter of lead 34. The first and second synthetic polymeric layers 92 and 94 and a portion of a third, polymeric layer 96 seal between lead 34 and the bore 52 of the ferrule 50. An upper portion of the third, polymeric layer 96 and a fourth, glass layer 98 seal between bore 52 and the outer surface of sleeve 90. A weld 100 between sleeve 90 and lead 34 at their upper ends completes the hermetic structure. Insulator and seal structure 88 provides for economy of manufacture as it can be secured in ferrule by layers 96,98 before capacitor assembly. Then, the terminal lead 34 is moved through the sleeve 90, layers 92 and 94 are filled into the ferrule and the terminal lead 34 is welded to the sleeve 90 at 100.

FIGS. 2 and 3 show the insulator and seal structure 36 of FIG. 4 incorporated into the capacitor 10. The anode 12 is provided with a notch forming a step 102 adjacent to end wall 26 of can 18. Step 102 provides clearance for the insulator and seal structure 36. In that manner, the portion of anode terminal lead 34 extending outside the capacitor 10 for connection to the load is hermetically sealed from the interior of the capacitor 10 and insulated from the can 18 and lid 30 serving as the terminal for the cathode electrode 14.

It will be apparent to those skilled in the art that in addition to constructing the capacitor having the various insulator and seal structures disposed inside the casing with the upper end of ferrule 50 slightly protruding or flush with the lid 30, the insulator and seal structures can also be mounted on the lid 30. For example, in the insulator and seal structure 66 shown in FIG. 5, the compression ring 70 can be welded to the lid 30 surrounding the opening 54. In the case of the insulator and seal structures 78 and 88 shown in FIGS. 6 and 7, respectively, the lower end of ferrule 50 can be welded to the upper surface of lid 30 such that the ferrule surrounds the opening 54. Furthermore, it should be understood that the various synthetic polymeric materials need not necessarily be in the exact arrangements shown. These materials can be provided in any order desired or, they may be provided independently as required to protect the glass layer from the electrolyte and from voltage breakdown. Also, the encapsulate layers used in the terminal ferrule can be filled therein either before or after the anode 12 and lead 34 are connected together and formed to a desired voltage.

Figure 8:
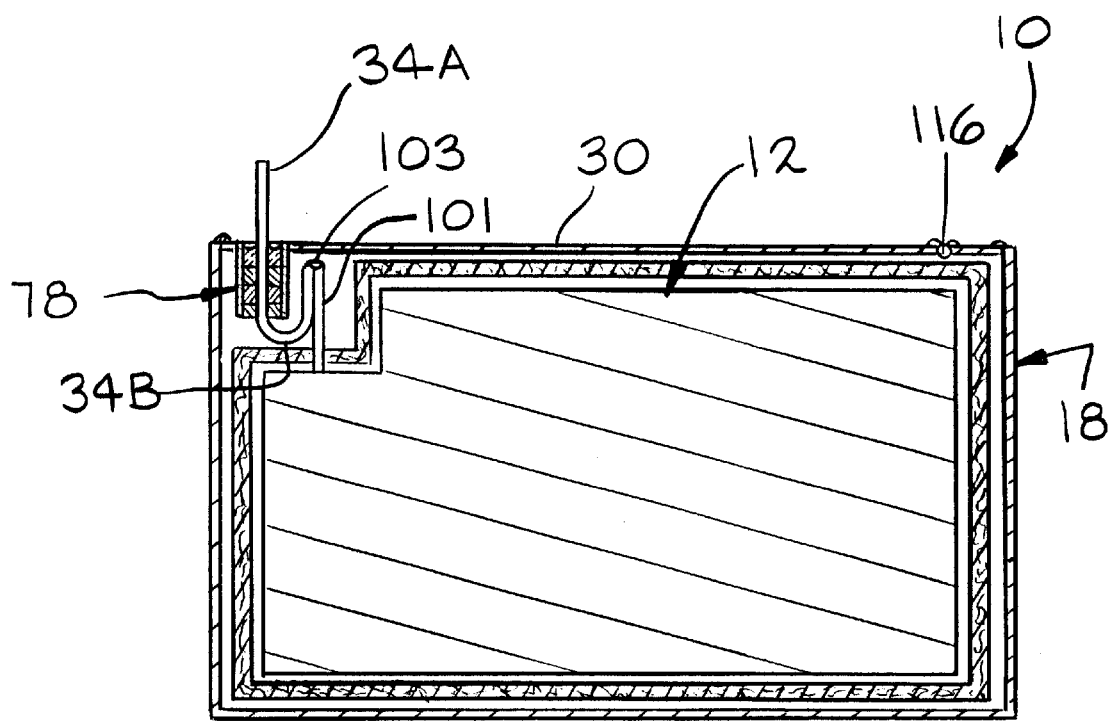
FIG. 8 is an elevational, cross-sectional view of an electrode lead-to-lead construction for a capacitor according to the present invention.

FIG. 8 shows an alternate embodiment of the capacitor 10 according to the present invention having a terminal lead 34A provided with a U-shaped portion 34B disposed inside the casing 18. The lead 34A is insulated from the can 18 and lid 30 by the insulator and seal structure 78 shown in FIG. 6. The anode 12 is provided with an anode conductor 101 connected to U-shaped terminal lead portion 34B by a weld 103. This lead-to-lead construction can be used in addition to the insulator and seal structures shown in FIGS. 4 to 7.

Figure 9:
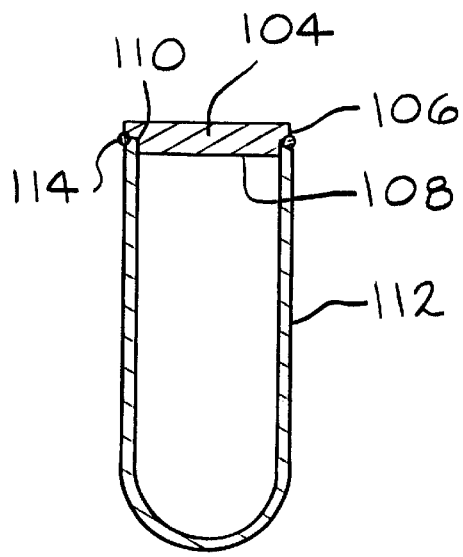
FIG. 9 is an elevational, cross-sectional view of an alternate embodiment of a lid 104 closing the capacitor casing.

After the cathode electrode 14 is disposed inside the can 18, the anode electrode 12 and the lid 30 as an assembly are fitted to the upper end of the can 18 and welded in place to provide a hermetic seal between the can and the lid. As shown in FIGS. 2 and 3, the lid 30 comprises a plate member having a shape sized to fit snugly inside the inner surface of the open end of can 18 and flush with the upper end thereof. The lid 30 is then secured in place by weld 32. In an alternate embodiment shown in FIG. 9, a lid 104 has a first, larger body portion 106 and a second, smaller body portion 108 which meet at a step 110 which is sized to be received by the upper end of a can 112. In that position, the surrounding wall of the first lid portion 106 is flush with the outer side wall of the can 112 and the surrounding wall of the second lid portion is in a snug-fitting relationship with the inner surface of can 112. A weld 114 hermetically secures the lid to the can. Also can 112 is shown having a curved bottom wall.

The anode electrode 12 and cathode electrode 14 are activated and operatively associated with each other by an electrolyte solution filled in the casing through the electrolyte fill opening 38. Any electrolyte that is known to activate the particular anode and cathode active materials selected to provide acceptable capacitive performance over a desired operating range is contemplated by the scope of the present invention. Suitable electrolytes include sulfuric acid in an aqueous solution. Specifically, a 38% sulfuric acid solution has been shown to perform well at voltages of up to about 125 volts. A 10% to 20% phosphoric acid/water solution is known to provide an increased equivalent series resistance (ESR) and breakdown voltage. Other suitable electrolytes are contemplated that provide desired performance characteristics.

Figure 10:
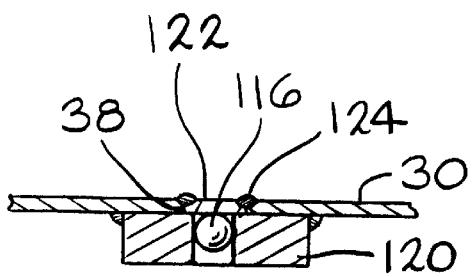
FIGS. 10, 10A and 11 are fragmentary, cross-sectional views of various embodiments of closure structures for the capacitor 10.
Figure 11:
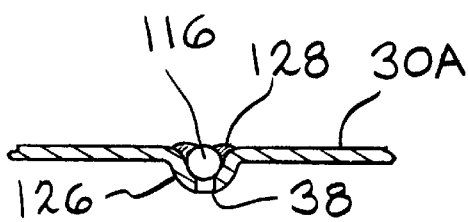

Referring to FIG. 2, lid 30 is provided with the closure structure 40 for the electrolyte fill opening 38 preferably having a slightly inwardly closing taper that receives a metal ball 116 secured therein by weld 118. Alternate embodiments of the closure structure are shown in FIGS. 10 and 11. In FIG. 10, a ring 120 having a cylindrical opening is secured to the under surface of lid 30 disposed coaxially with opening 38. Metal ball 116 is wedged in the opening of ring 120 to prevent out gassed by-products as a closure plate 122 is disposed in the opening in a snug fitted relationship and secured therein by weld 124.

Figure 10A:
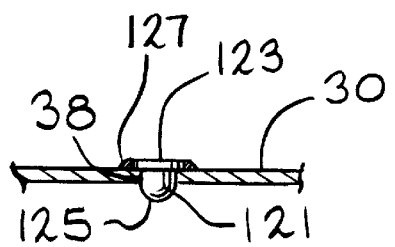

FIG. 10A shows a plug 121 having an enlarged head 123 and a curved end 125 welded at 127. If desired, plug 121 does not require the enlarged head 123 and/or the curved end 125 to provide a suitable closure for the electrolyte fill opening 38.

FIG. 11 illustrates another embodiment of the seal structure wherein the portion of lid 30A immediately adjacent to the fill opening 38 is deformed to have an annularly curved portion 126 that matches the curvature of ball 116. Ball 116 is received in the curved portion 126 and secured in place by weld 128 to complete the seal. For a more detailed discussion of closure structures suitable for use with the present invention, reference is made to U.S. Pat. No. 5,776,632 to Honegger, entitled "Hermetic Seal For An Electrochemical Cell", which is assigned to the assignee of the present invention and the disclosure of which is incorporated herein by reference.

FIGS. 12 to 15 illustrate alternate embodiments of capacitors according to the present invention having generally flat, planar geometries including side walls provided with electrode active material. Other than the various casing structures which are described immediately below, the capacitors of FIGS. 12 to 15 are similar to the capacitor 10 shown in FIGS. 1 to 3. FIG. 12 shows a capacitor 130 having side walls 132 and 134 which are welded to a ring 136 after being selectively provided with the electrode active material 42 in a similar manner as previously described with respect to capacitor 10.

FIG. 13 shows another embodiment of a capacitor 140 according to the present invention fabricated from an electrode active material 42 selectively contacted to a substrate provided in the shape of a cup having an annular side wall 142 extending from a bottom wall 144. The side wall 142 forms into an annular rim 146 which is generally normal to the plane of side wall 142. The rim 146 is connected to lid 148 by weld 150 to complete the enclosure.

FIG. 14 shows another embodiment of a capacitor 152 according to the present invention fabricated from an electrode active material 42 selectively contacted to a substrate provided in the shape of tray members 154 and 156. An annular back-up ring 158 fits inside the side wall portions of the trays 154, 156 to provide support when the trays are connected together along their respective edges by weld 160 to complete the casing enclosure.

FIG. 15 illustrates an alternate embodiment of a capacitor 170 according to the present invention fabricated from a first substrate provided with an electrode active material 42 selectively contacted thereto and formed to provide a side wall 172 disposed intermediate opposed bottom and lid walls 174 and 176, respectively. A second substrate selectively contacted with an electrode active material 42 is formed to provide a second side wall 178 disposed intermediate opposed bottom wall 180 and lid 182. Second side wall 178 is somewhat shorter in length than side wall 172 so that bottom wall 180 and lid 182 are overlapped by bottom wall 174 and lid wall 176 secured therein by welds 184 and 186. Again, opposed end walls (not shown) complete the casing enclosure.

FIG. 16 shows an embodiment of side-by-side capacitor cells 188 and 190 connected in parallel according to the present invention. The capacitor cells are housed in a deep drawn can 192 having the capacitive cathode active material 42 contacted to the opposed side walls 194 and 196. An intermediate side wall 198 extends from a mid-point of the bottom wall 200 and is provided with the cathode active material 42 on the opposed sides thereof. Anode active pellets 12A and 12B are disposed between the side wall 194 and intermediate wall 198 and between the intermediate wall and side wall 196, respectively. The anodes 12A and 12B are enveloped in respective separators 202 and 204. Terminal lead 34 extends from anode 12B which in turn is connected in parallel to anode 12A via lead 206. The insulator and seal structure 78 shown in FIG. 6 isolates the terminal lead 34 from the lid 30B connected to can 192 by a weld 208. An electrolyte (not shown) is filled in the casing to operatively associate and activate the capacitors. This side-by-side capacitor cells construction provides for reduced ESR in comparison to the capacitors shown in FIGS. 1 to 3 and 12 to 15, and further provides a construction by which increased cathode active material may be housed inside of a casing. Of course, those skilled in the art will realize that the capacitor embodiment shown in FIG. 16 need not be limited to two side-by-side capacitor cells but that two or more cells as desired may be connected in parallel according to the present invention.

The present capacitor constructions having the generally flat, planar geometry have been shown to improve the volumetric efficiency of a capacitor by about 15% to about 80% over that of standard cylindrically shaped capacitors of a comparable casing size. Further, it has been determined that the capacitance obtained from an electrode made from an ultrasonically generated aerosol of active material contacted to a generally flat, planar geometry according to the present invention is on the order of about 2 F/sq. in. as measured by AC impedance spectroscopy.

It is appreciated that various modifications to the inventive concepts described herein may be apparent to those skilled in the art without departing from the spirit and the scope of the present invention defined by the hereinafter appended claims.

What is claimed is:

1. A method for providing a capacitor, comprising the steps of:
   a) providing a casing;
   b) providing a first electrode comprising a capacitive material as a first electrode active material contacted to a conductive substrate in the form of an ultrasonically generated aerosol of the first electrode active material, wherein at least a portion of a side wall of the casing is provided by the conductive substrate itself or the conductive substrate is in electrical contact with the side wall forming the casing for the capacitor;
   c) positioning a second electrode inside the casing connected to a second electrode terminal insulated from the casing by a glass-to-metal seal;
   d) filling an electrolyte into the casing; and
   e) hermetically sealing the casing.

2. The method of claim 1 including providing the ultrasonically generated aerosol comprising aerosol particles, a majority of which have diameters of less than about 10 microns.

3. The method of claim 1 including providing the first electrode active material having an internal surface area of about 10 $m^2$/gram to about 1,500 $m^2$/gram.

4. A method for providing a capacitor, comprising the steps of:
   a) providing a casing comprised of spaced apart side walls joined by a surrounding intermediate wall;
   b) providing a first electrode comprising a first electrode active material contacted to at least one conductive substrate in electrical contact with a first electrode terminal wherein at least one of the side walls is provided by the conductive substrate itself or the conductive substrate contacted with the first electrode active material is in electrical contact with at least one of the side walls forming the casing for the capacitor;
   c) positioning a second electrode inside the casing at a position intermediate the spaced apart side walls, wherein the second electrode is connected to a second electrode terminal insulated from the casing by a glass-to-metal seal;
   d) filling an electrolyte into the casing; and
   e) hermetically sealing the casing.

5. The method of claim 4 including selecting the first electrode active material from the group consisting of an anodized-etched foil, a sintered active material with or without oxide, a double layer capacitive material, a semiconductive material, a pseudocapacitive material and a conductive polymeric material.

6. The method of claim 5 including forming the first electrode from an aerosol of the pseudocapacitive material comprising a first pseudocapacitive metal compound or precursor thereof contacted to the conductive substrate and heated to a temperature to solidify the first pseudocapacitive metal compound or convert the precursor to the solidified pseudocapacitive metal compound.

7. The method of claim 5 including selecting the pseudocapacitive material from the group consisting of an oxide, a nitride, a carbon nitride and a carbide, and mixtures thereof.

8. The method of claim 5 including selecting a first metal of the pseudocapacitive material from the group consisting of ruthenium, molybdenum, tungsten, tantalum, cobalt, manganese, nickel, iridium, iron, titanium, zirconium, hafnium, rhodium, vanadium, osmium, palladium, platinum and niobium, and mixtures thereof.

9. The method of claim 5 including providing the pseudocapacitive material comprised of a second metal.

10. The method of claim 9 including selecting the second metal from the group consisting of tantalum, titanium, nickel, iridium, platinum, palladium, gold, silver, cobalt, molybdenum, niobium, ruthenium, manganese, tungsten, iron, zirconium, hafnium, rhodium, vanadium, osmium, and mixtures thereof.

11. The method of claim 5 including providing the pseudocapacitive material comprised of ruthenium and tantalum.

12. The method of claim 5 including providing the pseudocapacitive material having a thickness of about a hundred Angstroms to about 0.1 millimeters.

13. The method of claim 4 including selecting the conductive substrate from the group consisting of tantalum, titanium, nickel, molybdenum, niobium, cobalt, stainless steel, tungsten, platinum, palladium, gold, silver, copper, chromium, vanadium, aluminum, zirconium, hafnium, zinc and iron, and mixtures and alloys thereof.

14. The method of claim 4 including providing the conductive substrate having a thickness of about 0.001 to 2 millimeters.

15. The method of claim 4 including increasing a surface area of the conductive substrate intended to be contacted with the first electrode active material prior to being contacted.

16. The method of claim 4 including providing the conductive substrate characterized as having had its surface increased in electrical conductivity prior to being contacted with the first electrode active material.

17. The method of claim 4 including providing the surrounding intermediate wall comprising opposed end walls, a top wall and a bottom wall joined to the spaced apart side walls.

18. The method of claim 4 including providing the capacitor of an electrochemical type.

19. The method of claim 4 including providing the first electrode as the cathode and further including providing the second electrode as the anode comprising a second electrode active material selected from the group consisting of a second anodized-etched foil, a second sintered active material with or without oxide, a second double capacitive material, a second pseudocapacitive material and a second conductive polymeric material.

20. The method of claim 19 wherein the second pseudocapacitive material is formed from an ultrasonically generated aerosol of the second pseudocapacitive material.

21. The method of claim 4 including providing the capacitor of an electrolytic type.

22. The method of claim 21 including providing the anode in the form of a pellet.

23. The method of claim 22 including sintering the pellet.

24. The method of claim 23 including providing an oxide layer on the sintered pellet.

25. The method of claim 21 including selecting the anode from the group consisting of tantalum, aluminum, titanium, niobium, zirconium, hafnium, tungsten, molybdenum, vanadium, silicon, and germanium, and mixtures and alloys thereof.

26. The method of claim 4 including providing the casing as the first electrode terminal.

27. The method of claim 4 including a ferrule member provided with at least one synthetic polymeric material sealing between the second electrode terminal and an inner surface of the ferrule and further including a glass layer disposed between the second electrode terminal and the ferrule.

28. The method of claim 4 including providing a ferrule member sealed in a polymeric cup-shaped member by a surrounding compression member secured to the casing.

29. The method of claim 4 including providing a metal sleeve sealed inside of a ferrule member by an insulative material and wherein the terminal lead is received inside the sleeve and sealed thereto by a weld.

30. A method for providing a capacitor, comprising the steps of:
  a) providing a casing comprised of spaced apart side walls joined by a surrounding intermediate wall;
  b) providing a first electrode comprising an active material of ruthenium and tantalum contacted to at least one conductive substrate in electrical contact with a first electrode terminal wherein at least one of the side walls is provided by the conductive substrate itself or active material is in electrical contact with at least one of the side walls forming the casing for the capacitor;
  c) positioning a second electrode inside the casing at a position intermediate the spaced apart side walls, wherein the second electrode is connected to a second electrode terminal insulated from the casing by a glass-to-metal seal;
  d) filling an electrolyte into the casing; and
  e) hermetically sealing the casing.

31. The method of claim 30 including a ferrule member provided with at least one synthetic polymeric material sealing between the second electrode terminal and an inner surface of the ferrule and further including a glass layer disposed between the second electrode terminal and the ferrule.

32. A method for providing a capacitor, comprising the steps of:
  a) providing a casing comprised of spaced apart first and second casing side walls joined by a surrounding casing end wall;
  b) providing a cathode electrode comprising a cathode active material in the form of an ultrasonically generated aerosol of the cathode active material contacted to at least two conductive substrates in electrical contact with a cathode terminal, wherein at least a portion of the first and second casing side walls are provided by the conductive substrates or the conductive substrates contacted with the cathode active material are in electrical contact with at least a portion of the first and second casing side walls;
  c) positioning a unitary anode electrode inside the casing intermediate the first and second casing side walls, wherein the anode electrode is connected to an anode terminal and having opposed first and second major faces joined by an intermediate anode end wall such that the first and second major faces are directly opposed by the respective spaced apart first and second casing side walls provided by the conductive substrates contacted with the cathode active material or the conductive substrates contacted with the cathode active material in electrical contact with at least a portion of the first and second casing side walls and with at least a portion of the intermediate anode end wall directly opposed by the casing end wall, wherein the anode is an anodized-etched foil or sintered active material with or without oxide of one of the group consisting of tantalum, aluminum, titanium, niobium, zirconium, hafnium, tungsten, molybdenum, vanadium, silicon, germanium, and mixtures and alloys thereof;
  d) filling an electrolyte into the casing; and
  e) hermetically sealing the casing, wherein the capacitor is capable of delivering about 2 $F/in.^2$.

33. The method of claim 32 wherein the cathode active material is a ruthenium-containing oxide and the anode is of sintered tantalum.

* * * * *